United States Patent
Cauwels et al.

(10) Patent No.: US 6,926,451 B2
(45) Date of Patent: Aug. 9, 2005

(54) MOBILE COMMUNICATION DEVICE HAVING A LIGHT ACCESSORY PORT

(75) Inventors: Patrick J. Cauwels, South Beloit, IL (US); Louis J. Lundell, Buffalo Grove, IL (US)

(73) Assignee: Motorola, Inc., Schaumburg, IL (US)

(*) Notice: Subject to any disclaimer, the term of this patent is extended or adjusted under 35 U.S.C. 154(b) by 140 days.

(21) Appl. No.: 10/680,524

(22) Filed: Oct. 7, 2003

(65) Prior Publication Data

US 2005/0074212 A1 Apr. 7, 2005

(51) Int. Cl.[7] ................................................. G02B 6/36
(52) U.S. Cl. ............................ 385/88; 385/24; 385/100
(58) Field of Search ............................... 385/4, 12, 24, 385/39, 88–94, 100–101

(56) References Cited

U.S. PATENT DOCUMENTS

| | | |
|---|---|---|
| 5,369,846 A | 12/1994 | Suarez et al. |
| 5,477,433 A | 12/1995 | Ohlund |
| 5,515,469 A | 5/1996 | Zarem et al. |
| 6,094,566 A | 7/2000 | Dasent et al. |
| 6,296,364 B1 | 10/2001 | Day et al. |
| 6,578,981 B2 | 6/2003 | Jackson et al. |
| 6,582,134 B2 | 6/2003 | Otera |
| 6,588,947 B2 | 7/2003 | Mine et al. |
| 2005/0018967 A1 * | 1/2005 | Huang et al. ............. 385/88 X |
| 2005/0078916 A1 * | 4/2005 | Hosking ..................... 385/88 |

* cited by examiner

*Primary Examiner*—Phan T. H. Palmer
(74) *Attorney, Agent, or Firm*—Matthew C. Loppnow

(57) ABSTRACT

A mobile communication device having a light accessory port. The mobile communication device can include a housing, a transceiver, a controller coupled to the transceiver, a light generating source coupled to the controller, and an optical transmission port coupled to the light generating source and coupled to the housing. The optical transmission port can be configured to optically and detachably couple a visibly perceptible light-emitting light output device to the mobile communication device.

24 Claims, 5 Drawing Sheets

MOBILE COMMUNICATION DEVICE HAVING A LIGHT ACCESSORY PORT

BACKGROUND

1. Field

The present disclosure is directed to a mobile communication device having a light accessory port. More particularly, the present disclosure is directed to a mobile communication device including a light source and an optical transmission port coupled to the light source.

2. Description of Related Art

Presently, different accessories are offered for mobile communication devices. Such mobile communication devices can include personal digital assistants, portable phones, or any other portable communication device. The accessories can include lanyards for hanging a mobile communication device around the neck of a user, charger cradles for charging a mobile communication device, headsets for audio input and output for the mobile communication device, and other accessories.

Unfortunately, these accessories may unnecessarily drain the battery of a mobile communication device. For example, an accessory may use a decorative electrical feature that requires battery power from the mobile communication device for operation. Because this electrical feature is external to the mobile communication device, the mobile communication device may not be able to control excessive power consumption of the accessory. This can lead to excessive current drain and reduced battery life for operation of the mobile communication device.

Thus, there is a need for reducing current drained by an accessory for a mobile communication device. There is also a need for increasing the appeal of an accessory by offering unique visual features to an accessory without adversely affecting the operational time of a mobile communication device.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
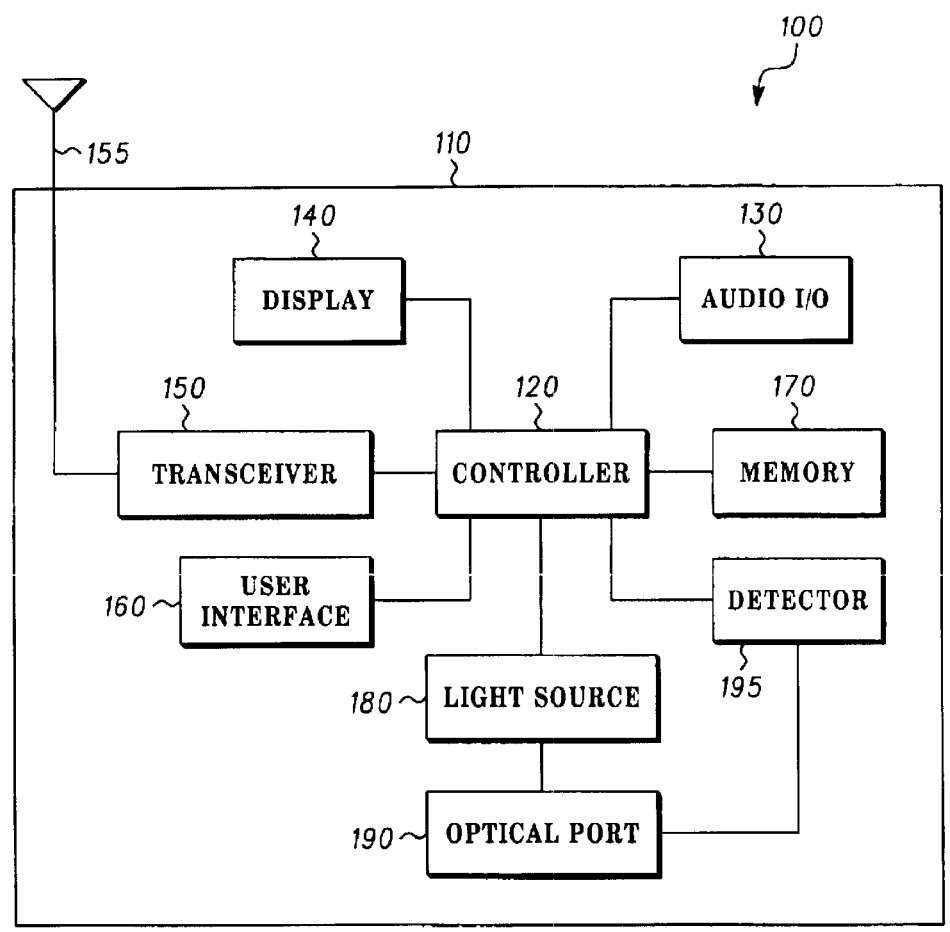
FIG. 1 is an exemplary block diagram of a mobile communication device according to one embodiment.

The disclosure provides a mobile communication device having a light accessory port. The mobile communication device can include a housing, a transceiver, a controller coupled to the transceiver, a light generating source coupled to the controller, and an optical transmission port coupled to the light generating source and coupled to the housing. The optical transmission port can be configured to optically and detachably couple a visibly perceptible light-emitting output device to the mobile communication device.

The light generating source may be at least one light emitting diode, a multi-color light emitting diode, an incandescent light source, or any other light source. The controller can be configured to control light generated by the light generating source by providing a signal to the light generating source. The controller can control light generated by the light generating source by flashing the light on and off, by flashing the light on and off in a sequential pattern, by flashing the light brighter and dimmer in a sequential pattern, by changing a color of light output from the light generating source, or by any other useful means of controlling light. The controller can also be configured to detect a ornamental light output device coupled to the optical transmission port and to enable the light generating source when the ornamental light output device is coupled to the optical transmission port. The controller can additionally be configured to receive a user assignment of a specified light output to a specified function and configured to enable the light generating source according to the specified light output when the specified function is activated. For example, the controller can be configured to detect an incoming communication and to enable the light generating source to indicate the detection of an incoming communication.

According to another embodiment, the disclosure provides a mobile communication device. The mobile communication device can include a transceiver, a controller coupled to the transceiver, a light generating source coupled to the controller, a housing providing a housing for the transceiver, the controller, and the light generating source, an optical transmission port coupled to the housing and coupled to the light generating source, and a visible light output device optically and detachably coupled to the optical transmission port.

The light generating source can be at least one light emitting diode, a multi-color light emitting diode, or any other light source. The visible light output device can be a lanyard including an optically conductive portion, the lanyard configured to be worn around the neck of a user of the mobile communication device. The optically conductive portion can include a fiber optic portion. The lanyard can further include a support reinforcing portion coupled with the optically conductive portion. The support reinforcing portion can be a wire, a string, or any other support device coupled with the optically conductive portion. The housing can be an internal frame housing and the visible light output device can be an external mobile communication device housing including an optically conductive portion. The visible light output device can additionally be a mobile communication device charger, a mobile communication device car mounting cradle, or any other useful device. The controller can be configured to control light generated by the light generating source by providing a signal to the light generating source. The controller can also controls light generated by the light generating source by at least one of flashing the light on and off, flashing the light brighter and dimmer in a sequential pattern, and changing a color of light output from the light generating source. The controller can also be configured to detect a visible light output device coupled to the optical transmission port and enable the light generating source when the visible light output device is coupled to the optical transmission port.

Thus, for example, the present disclosure can provide for decorative optical effects, such as multi-color active lighting, for mobile communication device visible light output devices, such as accessories, without requiring the accessory to have its own light source. The present disclosure can also provide for increased power control at a mobile communication device because the light source can be directly controlled within the mobile communication device. This can allow for increased control of power consumption, which can positively influence talk time, standby time, and the like. The present disclosure can further provide for illumination of an accessory without requiring an electrical connection to the accessory.

The present disclosure can additionally provide for a connection on a portable phone. The connection can include a mechanical and optical coupling for a decorative, non-electrical accessory such that a light source within the portable phone lights up the accessory and the lighting of the accessory is controlled by features inside the portable phone. The light source may be the same light source used for other mobile communication device features or may be dedicated to the accessory. The light source may only become active when an accessory is attached to the mobile communication device.

FIG. 1 is an exemplary block diagram of a mobile communication device 100 according to one embodiment. The mobile communication device 100 can include a housing 110, a controller 120 coupled to the housing 110, audio input and output circuitry 130 coupled to the housing 110, a display 140 coupled to the housing 110, a transceiver 150 coupled to the housing 110 and the controller 120, an antenna 155 coupled to the transceiver 150 and the housing 110, a user interface 160 coupled to the housing 110, a memory 170 coupled to the controller 120 and the housing 110, a light source 180 coupled to the controller 120 and the housing 110, an optical port 190 coupled to the controller 120 and the housing 110, and a detector 195 coupled to the controller 120 and the optical port 190.

The display 140 can be a liquid crystal display (LCD), a light emitting diode (LED) display, a plasma display, or any other means for displaying information. The transceiver 150 may include a transmitter and/or a receiver. The audio input and output circuitry 130 can include a microphone, a speaker, a transducer, or any other audio input and output circuitry. The user interface 160 can include a keypad, buttons, a touch pad, a joystick, an additional display, or any other device useful for providing an interface between a user and a electronic device. The memory 170 may include a random access memory, a read only memory, an optical memory, a subscriber identity module memory, or any other memory that can be coupled to a mobile communication device.

The light source 180 can be a light generating source such as at least one LED, at least one incandescent source, an ultraviolet LED, a multi-color light source, or any other light generating source. For example, the light source 180 may be a multi-color LED or multiple different colored LED's. The optical port 190 can be coupled to the light source 180. The optical port 190 can provide for optical transmission of light to and connection to an accessory device. For example, the optical port 190 can be configured to optically and mechanically couple a visibly perceptible light-emitting output device to the mobile communication device 100. The detector 195 can be a capacitive detector, a magnetic detector, a switch, an optical detector, or any other device useful for detecting the presence of another device.

In operation, the controller 120 can control the operations of the mobile communication device 100. The display 140 can display information to a user of the mobile communication device. The transceiver 150 can receive and transmit signals to and from the mobile communication device 100. The memory 170 can store data and programs used by the controller 120. The audio input and output circuitry 130 can receive and output audio signals from and to a user of the mobile communication device 100. For example, the audio input and output circuitry 130 can output, in audio format, signals received by the transceiver 150. The audio input and output circuitry 130 can also output music or other audio signals stored in the memory 170. The controller 120 can be configured sense an output of the detector 195. The controller can then detect a ornamental light output device coupled to the optical transmission port 190 and enable the light generating source 180 when the ornamental light output device is coupled to the optical transmission port 190.

According to one embodiment, the controller 120 can be configured to control light generated by the light generating source 180 by providing a signal to the light generating source 180. For example, the controller 120 can control light generated by the light generating source 180 by flashing the light on and off, by flashing the light on and off in a sequential pattern, by flashing the light brighter and dimmer in a sequential pattern, by changing a color of light output from the light generating source, or by any other useful method. The controller 120 can also be configured to detect an incoming communication on the transceiver 150. The controller 120 can then enable the light source 180 to indicate the detection of an incoming communication.

The controller 120 can be configured to receive a user assignment of a specified light output to a specified function. The controller 120 can then enable the light source 180 according to the specified light output when the specified function is activated. In particular, a user may assign a desired light output pattern to a specific function of the mobile communication device 100 to visibly indicate when the function is activated. For example, the user may assign different light outputs for flashing different patterns when music plays. The user may also assign different light outputs associated with different phonebook entries. A different light output can then be activated when calls are received from different callers based on matching a caller identification with the phone book entry and the corresponding specified light output. The user may additionally assign a specific light output for operation of a flip on a flip phone. The user may further make any other useful assignment of a specified light output to a mobile communication device function.

Figure 2:
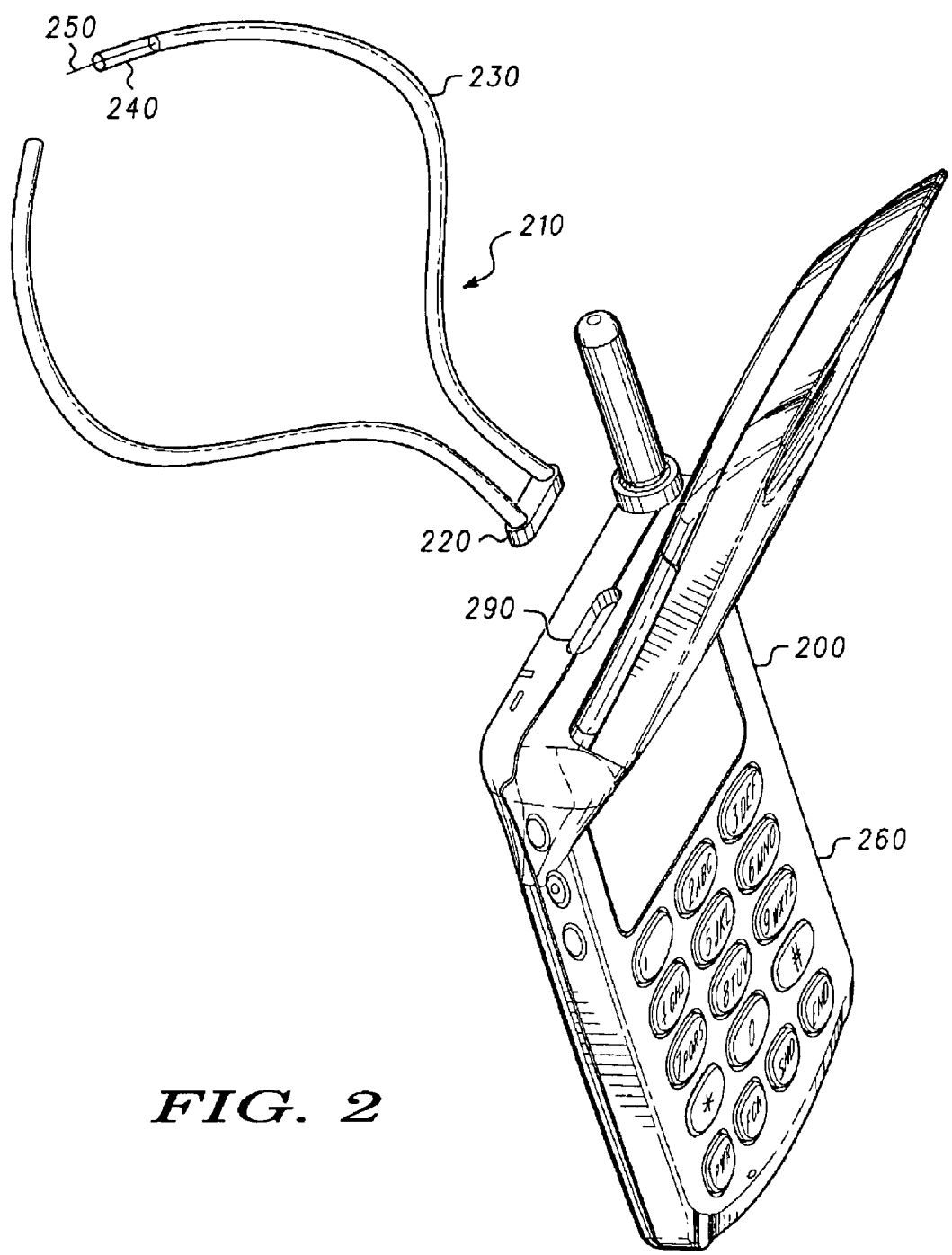
FIG. 2 an exemplary illustration of a mobile communication device and a visible light output device according to one embodiment.

FIG. 2 an exemplary illustration of a mobile communication device 200, such as the mobile communication device 100 and a visible light output device 210, according to one embodiment. The mobile communication device 200 can include an optical transmission port 290 and a removable mobile communication device housing 260. A portion of the removable mobile communication device housing can be optically conductive and thus, constitute another visible light output device. For example, the mobile communication device housing 260 can be optically coupled to a light source 180 via the optical transmission port 290 or via an internal optical transmission port, which is not shown. The internal optical transmission port may be located on a sub-housing or a sub-frame of the mobile communication device 200.

The visible light output device 210 can be an accessory for the mobile communication device 200. For example, the visible light output device 210 can include a connector 220 and a lanyard 230 that can be used to hang the mobile communication device 200 from the neck of a user. The lanyard 230 can include an optically conductive portion 240 that can include fiber optics or any other optically conductive material. The lanyard 230 can also include a support reinforcing portion 250 coupled with the optically conductive portion 240. The support reinforcing portion 250 can be a wire, a string, a housing for the optically conductive portion 240, or any other feature than can provide additional support for the optically conductive portion 240. However, the support reinforcing portion 250 may not be necessary if the optically conductive portion 240 is sufficiently strong to support the lanyard 230 and/or the mobile communication device 200.

In operation, the visible light output device 210 can connect to the mobile communication device 200 via the connector 220 and the optical transmission port 290. The controller 120 can detect the connection of the visible light output device 210 using the detector 195. The controller 120 can then enable the light source 180 to provide light to the visible light output device 210 via the optical transmission port 290.

Figure 3:
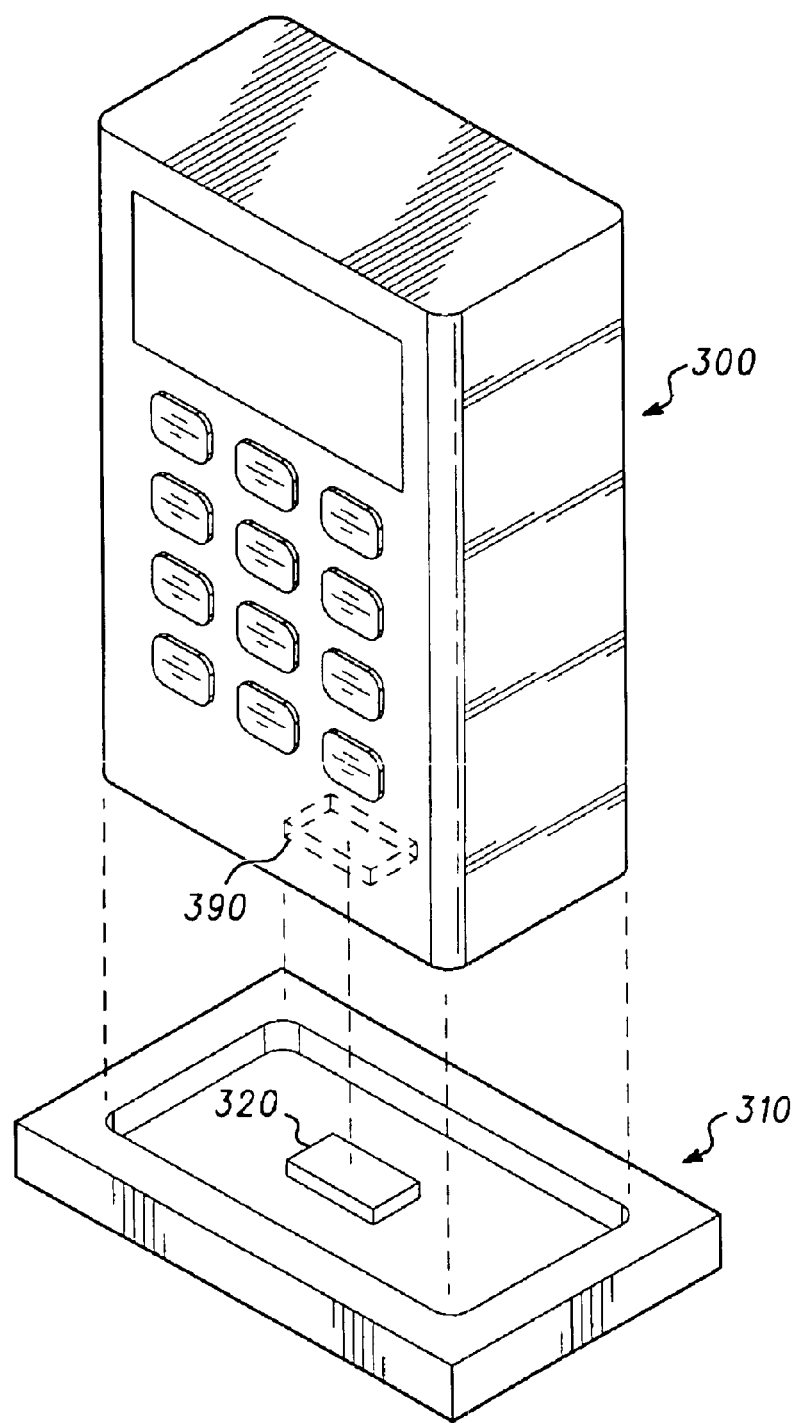
FIG. 3 an exemplary illustration of a mobile communication device and a visible light output device according to another embodiment.

FIG. 3 an exemplary illustration of a mobile communication device 300, such as the mobile communication device 100 and a visible light output device 310, according to another embodiment. The mobile communication device 200 can include an optical transmission port 390, such as the optical transmission port 190. The visible light output device 310 may be a mobile communication device car mounting cradle or base, a mobile communication device charger, or any other useful visible light output device 310 for a mobile communication device. The visible light output device 310 can include a connector 320.

In operation, the visible light output device 310 can connect to the mobile communication device 300 via the connector 320 and the optical transmission port 390. The controller 120 can detect the connection of the visible light output device 310 using the detector 195. The controller 320 can then enable the light source 180 to provide light to the visible light output device 310 via the optical transmission port 390. This light can be distributed throughout the visible light output device 310 using reflectors, fiber optics, or any other light distribution means. For example, fiber optics may lead directly to light output ports in the visible light output device 310. As another example, the light source 180 may provide ultraviolet light signals to the visible light output device 310. The visible light output device 310 can then use fluorescent or phosphorous inks on optics, such as fiber optics, to visibly communicate the light signals to a user.

Figure 4:
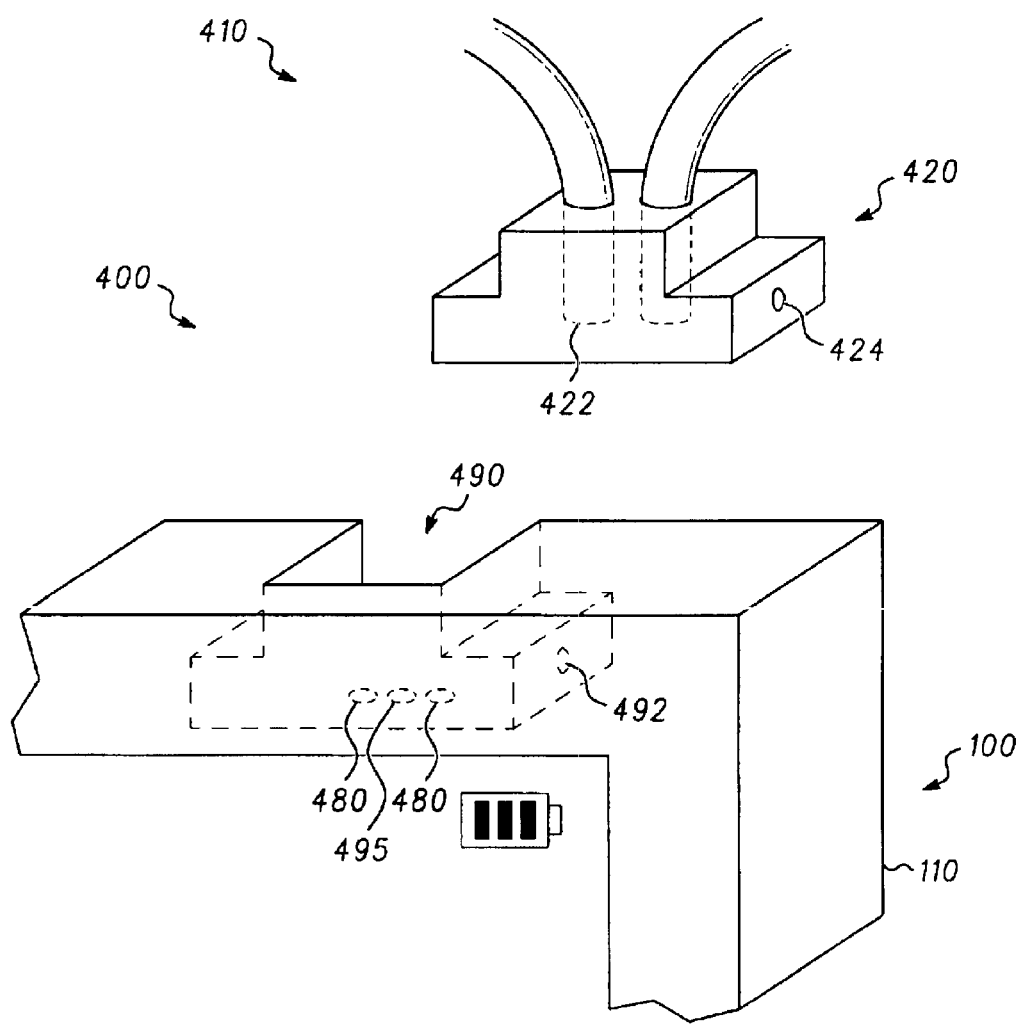
FIG. 4 is an exemplary illustration of an optical connection system for a mobile communication device according to one embodiment.

FIG. 4 is an exemplary illustration of an optical connection system 400 for a mobile communication device, such as mobile communication device 100, according to one embodiment. The optical connection system 400 can include a visible light output device 410 having a connector 420 and the mobile communication device 100 having the housing 110. The housing 110 can include an optical transmission port 490. The optical transmission port 490 can include at least one light source 480, at least one notch 492, and a detector 495. The connector 420 can be t-shaped and can include at least one light receptor 422 and a connection bump 424.

In operation, the connector 420 of the visible light output device 410 can connect to the mobile communication device 100 by sliding into the optical transmission port 490. The bump 424 can connect with the notch 492 to secure a connection between the connector 420 and the optical transmission port 490. When the connection is made, the detector 495 can detect the presence of the visible light output device 410. The controller 120 can receive a signal from the detector 495 and enable functions of the mobile communication device 100 that use the light source 480 and the visible light output device 410. The light source 480 can then direct light into the light receptor 422 for illuminating the visible light output device 410.

Figure 5:
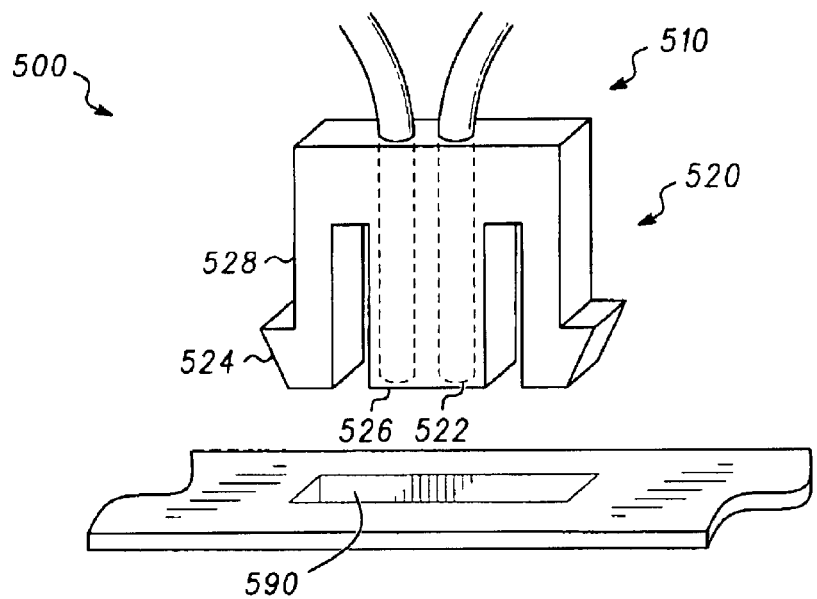
FIG. 5 is an exemplary illustration of an optical connection system for a mobile communication device according to another embodiment.

FIG. 5 is an exemplary illustration of an optical connection system 500 for a mobile communication device, such as mobile communication device 100, according to another embodiment. The optical connection system 500 can include a visible light output device 510 having a connector 520 and the mobile communication device 100 having the housing 110. The housing 110 can include an optical transmission port 590. The connector 520 can include at least one light receptor 522, a base 526, at least one leg 528, and a tab 524 on the at least one leg 528.

In operation, the connector 520 of the visible light output device 510 can connect to the mobile communication device 100 by sliding into the optical transmission port 590. The tab 524 can connect with notches (not shown) in the optical transmission port 590 to secure a connection between the connector 520 and the optical transmission port 590. When the connection is made, a detector 195 can detect the presence of the visible light output device 510. The controller 120 can receive a signal from the detector 195 and enable functions of the mobile communication device 100 that use the light source 180 and the visible light output device 510. The light source 180 can then direct light into the light receptor 522 for illuminating the visible light output device 510. To remove the visible light output device 510 from the mobile communication device 100, the leg 528 can be pinched against the base 526 to disengage the tab 524 from a notch in the optical transmission port 590.

Figure 6:
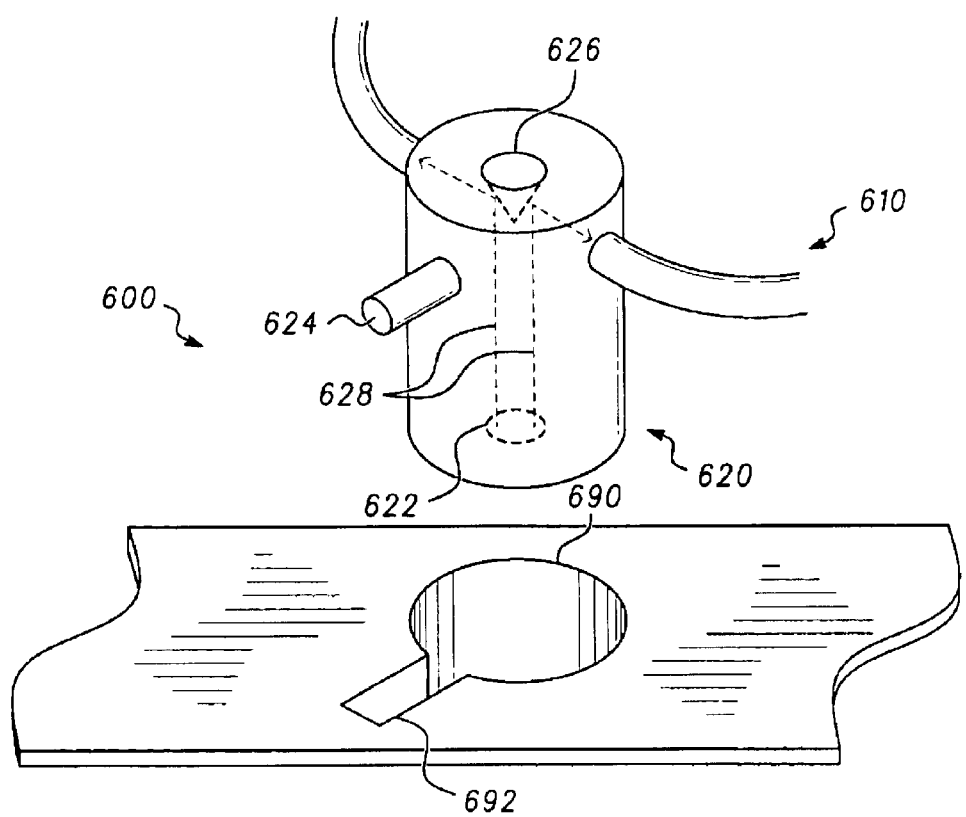
FIG. 6 is an exemplary illustration of an optical connection system for a mobile communication device according to another embodiment.

FIG. 6 is an exemplary illustration of an optical connection system 600 for a mobile communication device, such as mobile communication device 100, according to another embodiment. The optical connection system 600 can include a visible light output device 610 having a connector 620 and the mobile communication device 100 having the housing 110. The housing 110 can include an optical transmission port 690. The optical transmission port 690 can include at least one notch 692 and a detector 195. The connector 620 can be oval-shaped and can include at least one light receptor 622, a pin 624, and a reflector 626.

In operation, the connector 620 of the visible light output device 610 can connect to the mobile communication device 100 by coupling to the optical transmission port 690. The pin 624 can slide into the notch 692 and can be turned into an internal cavity in the optical transmission port 690 to secure a connection between the connector 620 and the optical transmission port 690. When the connection is made, the detector 195 can detect the presence of the visible light output device 610. The controller 120 can receive a signal from the detector 195 and enable functions of the mobile communication device 100 that use the light source 180 and the visible light output device 610. The light source 180 can then direct light 628 into the light receptor 622. The light 628 can be reflected by the reflector 626 for illuminating various portions of the visible light output device 610.

The method of this invention is preferably implemented on a programmed processor. However, controller 120 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A mobile communication device, comprising:

a housing;

a transceiver;

a controller coupled to the transceiver;

a light generating source coupled to the controller; and an optical transmission port coupled to the light generating source and coupled to the housing, the optical transmission port configured to optically and detachably couple a visibly perceptible light-emitting output device to the mobile communication device.

2. The mobile communication device according to claim 1, wherein the light generating source comprises at least one light emitting diode.

3. The mobile communication device according to claim 2, wherein the at least one light emitting diode is a multi-color light emitting diode.

4. The mobile communication device according to claim 1, wherein the controller is configured to control light generated by the light generating source by providing a signal to the light generating source.

5. The mobile communication device according to claim 1, wherein the controller controls light generated by the light generating source by flashing the light on and off.

6. The mobile communication device according to claim 1, wherein the controller controls light generated by the light generating source by flashing the light on and off in a sequential pattern.

7. The mobile communication device according to claim 1, wherein the controller controls light generated by the light generating source by flashing the light brighter and dimmer in a sequential pattern.

8. The mobile communication device according to claim 1, wherein the controller controls light generated by the light generating source by changing a color of light output from the light generating source.

9. The mobile communication device according to claim 1, wherein the controller is configured to detect a ornamental light output device coupled to the optical transmission port and enable the light generating source when the ornamental light output device is coupled to the optical transmission port.

10. The mobile communication device according to claim 1, wherein the controller is configured to receive a user assignment of a specified light output to a specified function and configured to enable the light generating source according to the specified light output when the specified function is activated.

11. The mobile communication device according to claim 1, wherein the controller is configured to detect an incoming communication and to enable the light generating source to indicate the detection of an incoming communication.

12. A mobile communication device, comprising:
    a transceiver;
    a controller coupled to the transceiver;
    a light generating source coupled to the controller;
    a housing providing a housing for the transceiver, the controller, and the light generating source;
    an optical transmission port coupled to the housing and coupled to the light generating source; and
    a visible light output device optically and detachably coupled to the optical transmission port.

13. The mobile communication device according to claim 1, wherein the optically conductive portion comprises a fiber optic portion.

14. The mobile communication device according to claim 13, wherein the lanyard further includes a support reinforcing portion coupled with the optically conductive portion.

15. The mobile communication device according to claim 14, wherein the support reinforcing portion comprises at least one of a wire and a string coupled with the optically conductive portion.

16. The mobile communication device according to claim 12, wherein the light generating source comprises at least one light emitting diode.

17. The mobile communication device according to claim 16, wherein the at least one light emitting diode is a multi-color light emitting diode.

18. The mobile communication device according to claim 12, wherein the visible light output device comprises a lanyard including an optically conductive portion, the lanyard configured to be worn around the neck of a user of the mobile communication device.

19. The mobile communication device according to claim 12,
    wherein the housing comprises an internal frame housing, and
    wherein the visible light output device comprises an external mobile communication device housing including an optically conductive portion.

20. The mobile communication device according to claim 12, wherein the visible light output device comprises at least one of a mobile communication device charger and a mobile communication device car mounting cradle.

21. The mobile communication device according to claim 12, wherein the controller is configured to control light generated by the light generating source by providing a signal to the light generating source.

22. The mobile communication device according to claim 12, wherein the controller controls light generated by the light generating source by at least one of flashing the light on and off, flashing the light brighter and dimmer in a sequential pattern, and changing a color of light output from the light generating source.

23. The mobile communication device according to claim 12, wherein the controller is configured to detect a visible light output device coupled to the optical transmission port and enable the light generating source when the visible light output device is coupled to the optical transmission port.

24. A mobile communication device, comprising:
    means for providing a housing for mobile communication device components;
    means for controlling operations of the mobile communication device;
    means for connecting a visible light output accessory to the means for providing a housing;
    means for detecting a connection of the visible light output accessory; and
    means for providing light to the a visible light output accessory through the means for connecting a visible light output accessory.

* * * * *